March 25, 1969 T. J. HARRIS ET AL 3,435,370
HIGH SPEED LASER FREQUENCY SELECTOR
Filed Dec. 16, 1965

INVENTORS
THOMAS J. HARRIS
ERHARD MAX

United States Patent Office 3,435,370
Patented Mar. 25, 1969

3,435,370
HIGH SPEED LASER FREQUENCY SELECTOR
Thomas J. Harris, Poughkeepsie, and Erhard Max, Wappingers Falls, N.Y., assignors to International Business Machines Corporation, Armonk, N.Y., a corporation of New York
Filed Dec. 16, 1965, Ser. No. 514,216
Int. Cl. H01s 3/05
U.S. Cl. 331—94.5        8 Claims This invention relates to a high speed frequency selector for a laser and, more particularly, to an electro-optical apparatus for selecting one or more laser frequencies.

A typical gas laser will lase or oscillate in several distinct spatial and longitudinal modes and frequencies or colors. Each frequency or wavelength is called a laser line. Material, such as argon gas or a mixture of helium and neon gas, pumped to cause a negative temperature or population inversion of the energy levels will lase. The negative temperature medium is placed between two reflecting surfaces or mirrors, one of which is the output mirror and is partially transparent to the stimulated optical radiation which is produced by the lasing action. The radiation is reflected as a beam back and forth through the medium which releases energy to the beam, thereby amplifying the beam. When the energy released to the beam by stimulated emission exceeds the losses in the cavity, oscillation or lasing occurs.

In some applications of lasers, it is desirable to control the operation of the laser cavity so that a desired color or frequency is obtained at the output. The intensity of the different laser colors or lines depends on their gain in the laser cavity. The gain of a laser line is determined by the degree of population inversion between the levels of the electrons that emit the laser line and by the optical Q of the cavity for this line. Therefore, tuning or frequency mode selection can be accomplished by the individual control of the population inversion or the optical Q for each laser line.

In the prior apparatus for tuning a laser to select one laser line, a rotatable prism was placed in the optical cavity to produce dispersion so that all lines but the selected line were deflected out of the cavity, thereby permitting only the selected line or frequency to lase. However, such a laser tuning system is too slow for high speed applications since the prism must be mechanically rotated to change the lasing frequency.

Accordingly, it is a general object of this invention to provide a high speed electronic laser frequency selector.

Another object of the invention is to provide a laser frequency selector which electro-optically prevents the lasing of all laser lines except a selected laser line.

A specific object of the invention is to provide a laser frequency selector which prevents lasing of all but one selected frequency by utilizing controllable electro-optic means and rotary dispersion means to influence the optical Q of each laser line.

Another specific object of the invention is to provide a laser frequency selector which influences the optical Q for each laser line by electro-optic phase control means.

Another object of the invention is to provide a laser frequency selector which permits the simultaneous selection of plural laser frequencies.

Briefly, the foregoing objects are accomplished in a first preferred embodiment by placing in the laser cavity a dispersive crystal for dispersion or separating the linearly polarized laser lines and an electro-optic rotator which is externally controlled. The dispersive crystal imparts to each light wavelength passing therethrough a different characteristic angular rotation or dispersion of the polarization direction. The electro-optic rotator imparts substantially the same rotation to all light wavelengths. However, the rotation of the electro-optic rotator depends upon the electric field applied thereto. This field may be applied by means of a variable external voltage source so that the angular rotation of the rotator may be controlled. A particular laser line or frequency is selected by adjusting the electric field applied to the electro-optic rotator so that the resultant rotation of he direcion of polarizaion of the light after passing through both the optically active crystal and the electro-optic rotator is zero. When this condition prevails, all laser lines except the selected laser line will suffer optical losses in the polarizing components of the laser cavity to such a degree that they will not lase. Only the selected line will be repeatedly reflected through the laser negative temperature medium with sufficient intensity to cause lasing.

In a second preferred embodiment a particular laser line is selected by passing all the lines through a dispersive phase plate and then through a controllable electro-optic phase plate which is controlled so that the selected line experiences zero effective resultant phase shift. The non-selected lines suffer losses in the polarizing components of the laser cavity and consequently will not lase.

The foregoing and other objects, features and advantages of the invention will be apparent from the following more particular description of preferred embodiments of the invention as illustrated in the accompanying drawing.

Figure 1:
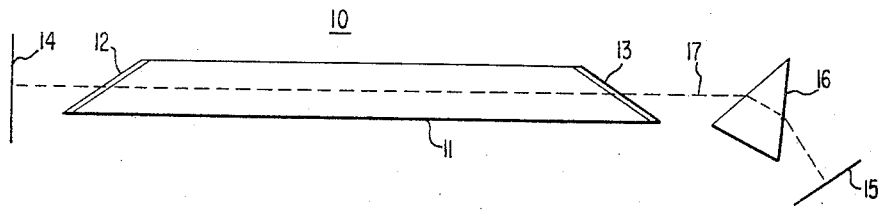
FIGURE 1 is a schematic diagram of a prior art system for selecting laser lines in a laser cavity.

In the drawing, FIGURE 1 shows a prior art mechanical laser tuner. The laser cavity 10 includes a laser tube 11 containing a negative temperature medium. Brewster windows 12 and 13 form the two end walls of tube 11. A mirror 14 is spaced from the left end of tube 11, and a mirror 15 is spaced from the right end. A rotatable prism 16 is disposed between the mirror 15 and the right end of tube 11. The path of the stimulated light radiation emitted from laser 11 is indicated by the dashed line 17.

The angular dispersion of prism 16 depends upon both the wavelength of incident light and the angle of incidence. Several laser lines will pass through Brewster window 13, but prism 16 may be mechanically rotated so that all laser lines but a selected one will be refracted to such a degree that they are reflected out of laser cavity 10. Consequently, only the selected line will be reflected back and forth through the negative temperature medium of laser tube 11, and lasing will occur only at the selected frequency. Mirror 15 is partially transparent so that an output may be obtained from the cavity.

Figure 2:
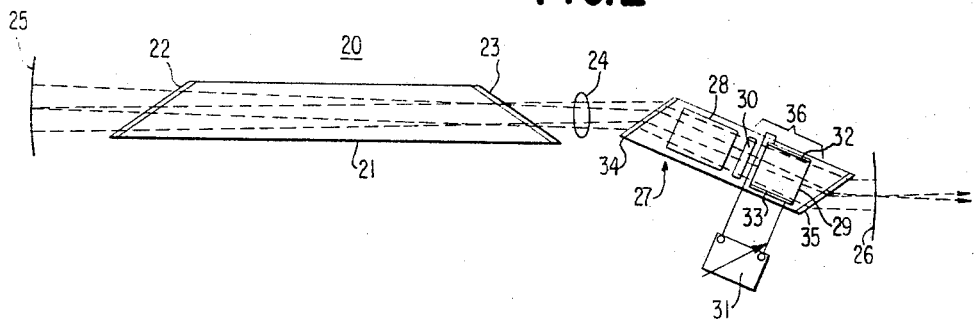
FIGURE 2 is a schematic diagram of a preferred embodiment of a high speed laser frequency selector embodying the principles of this invention.

In the preferred embodiment shown in FIGURE 2, a laser cavity is designated by the reference numeral 20. A laser tube 21 is placed in the cavity and contains a negative temperature medium, such as an excited mixture of helium and neon.

Brewster windows 22 and 23 form the end walls of laser tube 21. Each window is inclined at its Brewster's angle to the optical axis of path 24 of the cavity 20. A curved highly reflecting dielectric mirror 25 is spaced from window 22, and a similar mirror 26 is spaced from window 23. Furthermore, mirror 26 is also partially transparent to provide a laser beam output from the laser cavity.

Disposed in the optical path between Brewster window 23 and mirror 26 is a frequency selecting cavity 27 which contains an optically active crystal 28, such as quartz; an electro-optic crystal 29, such as hexamethylene tetramine (HMTA); and a quarter-wave plate 30.

A variable DC voltage source 31 connected to electrodes 32 and 33 mounted on the opposite sides of electro-optic crystal 29 to control the transverse electro-optical effect of the crystal.

The frequency selecting cavity 21 is enclosed by Brewster angle windows 34 and 35 and filled with an index matching fluid to reduce to a minimum reflection losses within the cavity 27. The Brewster angle windows are also used to keep reflection losses at the air-window boundary to a minimum (0.1% or less). The Brewster windows also function as polarizers to linearly polarize the laser beam parallel to the plane of incidence of the windows. Consequently, only one direction of linear polarization or vibration is permitted to pass through the windows without losses, and all other polarizations suffer varying degrees of losses depending upon the deviation from the preferred linear polarization direction.

Before discussing the operation of the frequency selecting cavity 27, let us consider the optical path in the laser cavity 20. Starting at one point in the negative temperature medium in tube 21, the radiation will suffer two reflections before it passes the same point in the original direction. The negative temperature medium acts as an amplifier, and all other components in the cavity introduce loss. If the amplification is sufficient to overcome the losses, then the system will oscillate or lase.

Let us now consider the losses in the frequency selecting cavity 27. The cavity is filled with an index matching fluid to reduce reflection losses within the cavity to a minimum. To determine the loss in the cavity, we must consider the reflection at the interfaces of the materials in the cavity. The quartz crystal 28 has an index of refraction of 1.54 at 6000 A., the HMTA electro-optic crystal 29 has a refractive index of 1.58 to 6000 A., and assume the index matching fluid has a refractive index of 1.56. It can then be shown that the reflection loss at each fluid-crystal boundary is $4.1 \times 10^{-3}\%$. The total loss within the cavity 27 will then be equal to the product of the loss per interface and the total number of interfaces crossed in two passes through the cavity. In this case there are sixteen boundary crosses so that the total loss may be calculated to be $6.56 \times 10^{-2}\%$.

Besides reducing reflection losses, the Brewster angle windows also linearly polarize the laser beam parallel to the plane of incidence. Consequently, light with the correct polarization will leave the frequency selecting cavity 20 through the Brewster window 35, be reflected from the high reflectivity dielectric mirror 26, and re-enter the frequency selecting cavity with minimum loss.

Color or frequency selection is accomplished by means of this invention by electro-optically introducing frequency or color dependent losses into the laser cavity. If this additional loss equals or exceeds the gain within the negative temperature media for a given frequency, then that frequency will not lase.

In general, this additional loss is accomplished by the rotary dispersion of the lines in the laser beam by means of the quartz crystal 28 in combination with the electro-optic rotator 36 formed by electro-optic crystal 29 and quarter wave plate 30. Rotator 36 is electrically controllable to return only a selected line or frequency to the polarization direction which will be passed without loss by the Brewster window 35. The manner in which rotator 36 functions to rotate the direction of polarization or vibration is described in a copending U.S. patent application Ser. No. 285,833 filed June 5, 1963, now U.S. Patent No. 3,375,052 and having the same assignee as this application.

Figure 4:
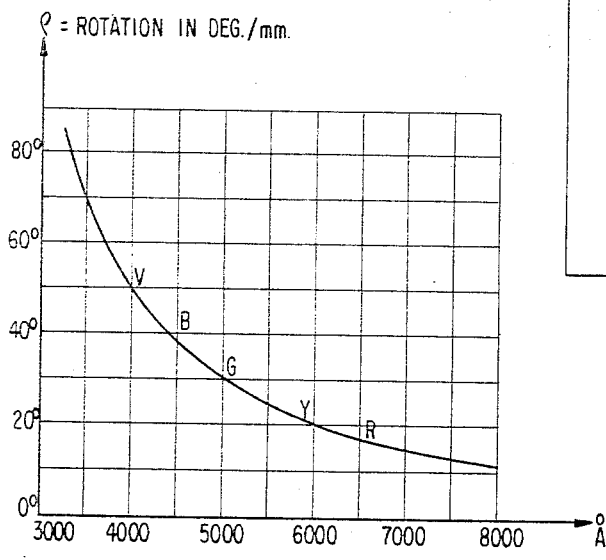
FIGURE 4 is a plot of the angular dispersion in degrees per mm. of quartz versus the light wavelength in A.
Figure 3:
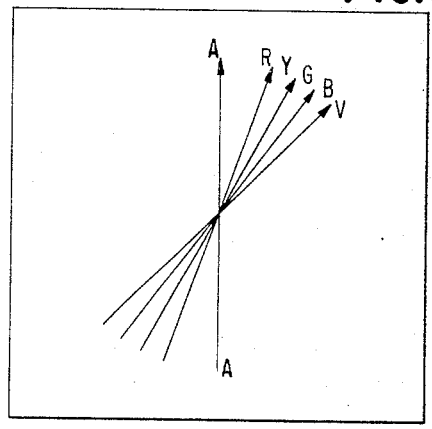
FIGURE 3 is a diagram showing the manner in which linearly polarized light is dispersed or separated by an optically active quartz crystal.

The manner in which frequency dependent losses are introduced through rotary dispersion in quartz crystal 28 is illustrated diagrammatically in FIGURES 3 and 4. Let plane polarized light be incident normally on a quartz plate, and let the direction of its vibration be indicated by AA. Upon passing through a one mm. thickness of the crystal, the violet light (V) is rotated about 50°, the red (R) about 15°, and the other colors are rotated through intermediate angles. This rotary dispersion for a one mm. plate is called the "specific rotation."

The operation of the frequency selector 27 can be understood by reference to Table I.

TABLE I

| (1) λ (A.) | (2) ρ (°/mm.) | (3) B (degrees) | (4) φ (degrees) | (5) θ (degrees) |
|---|---|---|---|---|
| 5,940 | 22 | 1,100 | 20 | −20 |
| 6,046 | 21.3 | 1,065 | 345 | +15 |
| 6,118 | 20.8 | 1,040 | 320 | +40 |
| 6,328 | 19.45 | 972.5 | 252.5 | −72.5 |
| 6,401 | 18.9 | 945 | 225 | −45 |
| 7,306 | 13 | 650 | 290 | +70 |

Figure 5:
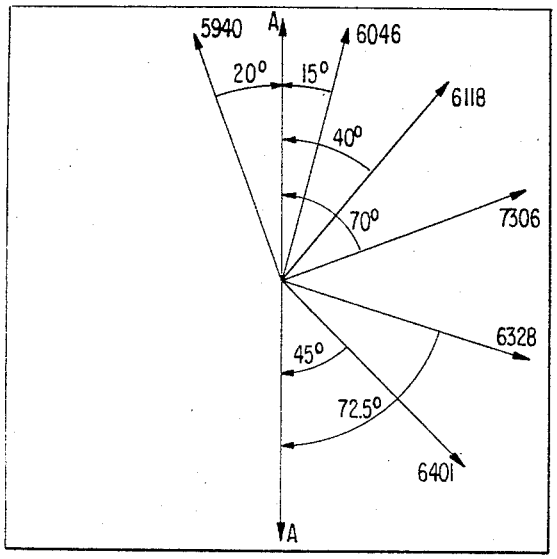
FIGURE 5 is a diagram showing the angular dispersion of the linearly polarized lines from a helium-neon laser after passage through approximately 50 mm. of optically active quartz.

In column 1 are listed six of the possible wavelengths λ which will lase in a helium-neon laser. In column 2 are listed the specific rotations ρ in degrees per mm. of the quartz rotator 28 at each of the laser wavelengths in column 1. In column 3 is listed the total rotation B in degrees of each wavelength passing through a fifty mm. quartz crystal. In column 4 there is listed in degrees φ or mod. 2π of B which is the net counterclockwise rotation of each wavelength from the original direction of polarization, AA, i.e. before entering the quartz. In column 5 there is listed θ in degrees where θ indicates the angle through which rotator 36 must rotate each wavelength so that it will pass through the Brewster windows without substantial loss. θ is also illustrated grapically in FIGURE 5.

Let us assume that it is desired to select a lasing wavelength λ of 6401 A. Table I indicates that electro-optic rotator 36 must rotate the polarization or vibration direction of the light emerging from the quartz rotator 28 by −45°, i.e. 45° clockwise so that the vibration direction is again coincident with AA. The electro-optic rotation or rotator 36 is controlled by varying the DC voltage from the variable DC voltage source 31. The linearly polarized 6401 A. wavelength emerges from cavity 27 without loss through Brewster angle window 35 and is reflected by mirror 26. This wavelength also re-enters cavity 27 without loss and the electro-optic rotator 36 and quartz rotator 28 performs a reciprocal operation such that the light is again polarized in the AA direction when emerging from window 34. This wavelength then proceeds through the negative temperature medium of laser tube 21 to mirror 25 and back to the starting point. For this wavelength of 6401 A. the losses in the laser cavity are at a minimum, and lasing will occur at this wavelength.

Let us now consider the closest adjacent wavelength 5940 A. for the same DC voltage applied to the electro-optic rotator 36. The vibration direction of this wavelength will also be rotated 45° clockwise. However, from Table I, the required rotation for 5940 A. light is only 20°. The loss introduced by the Brewster windows and incorrect rotation for this error of 20° equals $\sin^2(20°)$ or 11.7%. This additional 11.7% loss introduced into the laser cavity is sufficient to prevent lasing at 5940 A. Of course, losses are higher for the other wavelengths since the angular error of the direction of vibration or polarization with respect to the preferred polarization direction AA is greater.

Figure 6:
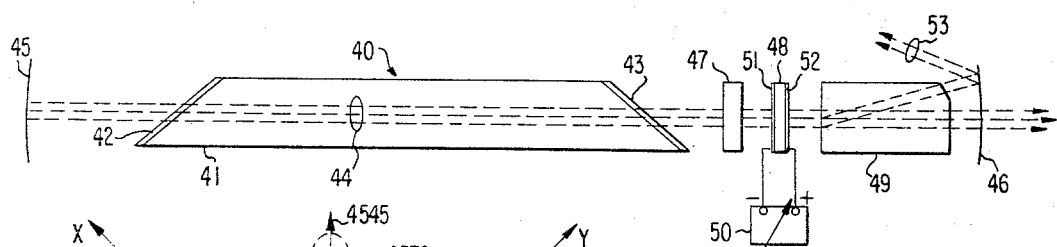
FIGURE 6 is a schematic diagram of a second embodiment of a high speed laser frequency selector embodying the principles of this invention.

Another embodiment of this invention is illustrated in FIGURE 6. In this second embodiment, the linearly polarized laser beam is passed through a phase plate whose phase shift is a strong function of the light frequency (wavelength). Therefore, instead of the electro-optic rotator 36 of the FIGURE 2 embodiment, an electro-optic phase plate is used to introduce additional phase shift such that only light of the selected wavelength is linearly polarized parallel to the plane of incidence of the Brewster angle window, and passes therethrough with substantially no loss. Other wavelengths are elliptically polarized and will suffer losses in passing through the Brewster angle window and thus will be prevented from lasing. Even though an electro-optic crystal is utilized in both embodiments, the first embodiment operates on the principle of controllable rotation of linearly polarized light, and the second embodiment operates upon the principle of controllable phase shift of the light.

In the second embodiment illustrated in FIGURE 6, a laser cavity is designated by the reference numeral 40. A laser tube 41 is placed in the cavity and contains a negative temperature medium, such as argon or other ionized gases.

Brewster windows 42 and 43 form the end walls of laser tube 41. Each window is inclined at its Brewster's angle to the optical axis or path 44 of the cavity 40. A curved highly reflecting dielectric mirror 45 is spaced from window 42, and a similar mirror 46 is spaced from window 43. Furthermore, mirror 46 is also partially transparent to provide a laser beam output from the laser cavity. The Brewster windows allow only one direction of vibrations or linear polarization to pass without losses. All other polarization states will suffer losses. Consequently, all output wavelengths or lines produced by laser 41 will be linearly polarized parallel to the plane of incidence of the Brewster windows 42 and 43. Reflection losses in this case can be minimized by coating each element 47, 48 and 49 with an anti-reflective coating or by mounting these elements in a cavity similar to the one shown in FIGURE 2.

Disposed in the optical path between Brewster window 43 and mirror 46 is a dispersive gypsum phase plate 47, an electro-optic phase crystal 48, and a polarizing calcite crystal 49. A variable voltage supply 50 is connected to electrodes 51 and 52 mounted on the opposite faces of crystal 48. These electrodes have holes at their center and the fringing field electro-optic effect is used. Elements 47, 48 and 49 form the frequency selector for the laser cavity. The linearly polarized light from laser tube 41 is converted to elliptically polarized light by phase plate 47. The ellipticity introduced by plate 47 is a function of the geometry of the plate and the material from which the plate is made, and also is a strong function of light wavelength.

Electro-optic crystal 48 imparts substantially the same phase shift to all wavelengths of light. However, the amount of shift is a function of the electric field across the plate. By varying the voltage across electrodes 51 and 52, one may vary the amount of phase shift introduced by the electro-optic crystal. The phase crystal 48 may be a potassium dideuterium phosphate ($KD_2PO_4$) crystal, HMTA, potassium tantalum niobate (KTN), or any other electro-optic crystal.

In operation, the argon gas in tube 41 is suitably pumped with energy to establish a population inversion or negative temperature between energy levels. The stimulated emission from the excited gas is coherent light. The reported visible laser lines of argon are shown in column 1 of Table II.

TABLE II

| (1) $\lambda$ (A) | (2) $\phi$ (degrees) | (3) $\Delta\phi$ (degrees) | (4) $\psi$ (°/volt×10$^{-2}$) |
|---|---|---|---|
| 4,545 | 2,328.7 | 168.7 | 6.381 |
| 4,579 | 2,299.6 | 139.6 | 6.322 |
| 4,650 | 2,262.2 | 102.2 | 6.217 |
| 4,727 | 2,227.6 | 67.6 | 6.109 |
| 4,764 | 2,212.6 | 52.6 | 6.057 |
| 4,880 | 2,164.4 | 4.4 | 5.9045 |
| 4,965 | 2,123.0 | −37.0 | 5.7955 |
| 5,017 | 2,107.5 | −52.5 | 5.731 |
| 5,145 | 2,057.1 | −102.9 | 5.5795 |

TABLE III

| (1) $\lambda$ (A) | (2) $\Delta\psi$ (2,644 v.) | (3) $\Delta\phi+\Delta\psi$ (2,644 v.) | (4) losses (percent) (2,644 v.) |
|---|---|---|---|
| 4,545 | −168.7 | 0 | 0 |
| 4,579 | −167.1 | −27.5 | 5.7 |
| 4,650 | −164.3 | −62.1 | 26.5 |
| 4,727 | −158.8 | −91.2 | 51.0 |
| 4,764 | −158.6 | −106.0 | 63.8 |
| 4,880 | −156.1 | −151.7 | 94.0 |
| 4,965 | −153.2 | −190.2 | 99.2 |
| 5,017 | −151.5 | −204.0 | 95.8 |
| 5,145 | −147.5 | −250.4 | 65.7 |

All the laser lines will pass through Brewster window 43 and be linearly polarized parallel to the plane of incidence. The total phase shift $\phi$ in degrees for a 300 micron gypsum phase plate 47 is listed in column 2 of Table II and the effective phase shift or difference $\Delta\phi$ from the original linear polarization is shown in column 3. The specific dispersion or phase shift $\psi$ for electro-optic crystal 48 ($KD_2PO_4$) is listed in column 4 of Table II in degrees per volt.

Figure 7:
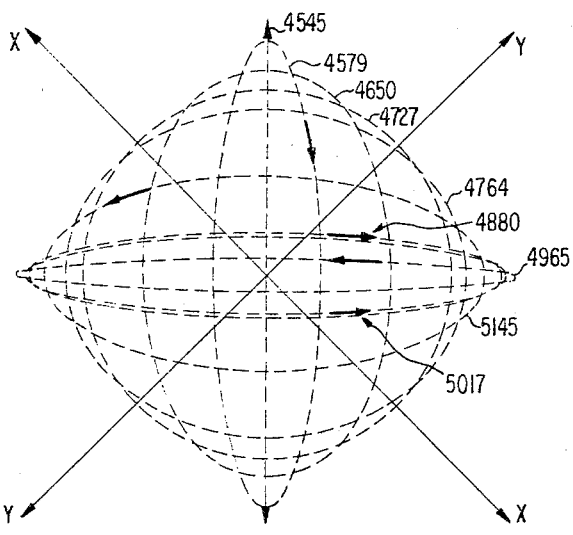
FIGURE 7 is a diagram qualitatively showing the elliptical polarization states of the selected laser line and the elliptically polarized non-selected lines occurring in the embodiment illustrated in FIGURE 6.

If the laser line of 4545 A. is to be selected, it can be determined from the ratio $\Delta\phi/\psi$ that a voltage of 2644 volts must be applied to crystal 48. The effective phase shift or difference $\Delta\phi$ of the crystal 48 for each of the wavelengths is shown in column 2 of Table III. The total or resultant effective phase shift $\Delta\phi+\Delta\psi$ of plates 47 and 48 for 2644 volts applied to plate 48 is listed in column 3 of Table III. Note that the resultant phase shift is zero for the laser line 4545 A. All other lines will remain elliptically polarized and thereby will suffer losses in passing through the polarizing crystal 49. The polarization states of the laser lines after passing through plates 47 and 48 are shown qualitatively in the diagram of FIGURE 7. The polarizer 49 passes without loss the selected line 4545 A., but will attenuate the elliptically polarized lines whose component oscillations in the horizontal direction follow the path of the extraordinary ray and are deflected out of the cavity as indicated by the dashed lines 53. The losses suffered by the non-selected wavelengths in the polarizer 49 are listed in column 4 of Table III. Additional losses are introduced at the Brewster angle window 43.

Any of the laser lines for argon may be selected by referring to Table II to determine the phase shift $\Delta\phi$ for phase plate 47 and then by applying to the electro-optic phase plate 48 the necessary voltage to make the resultant phase shift for both plates equal to zero for the selected line. The voltage is $\Delta\phi/\psi$ which may be determined from columns 3 and 4 of Table II. Only the selected laser line will be multiply reflected through the laser tube 41 with sufficient intensity to sustain a lasing action, i.e. oscillation. The non-selected lines will suffer losses in polarizer 49 and consequently will not lase.

Polarizer 49 may be omitted when the separation of the laser lines of the negative temperature medium is wide enough so that the polarizing action of the Brewster windows introduces sufficient losses in the non-selected lines to provide sufficient sensitivity for frequency selection.

The laser frequency selector is shown only schematically in FIGURE 6. In an actual system, the frequency selector elements 47, 48 and 49 would be enclosed in a separate chamber with index matching fluid or optical cements to reduce reflection losses at the optical interfaces and have end walls in the form of Brewster windows which are suitably oriented to pass the linearly polarized selected laser line.

It is also possible to replace plates 47, 48 and 49 with a single electro-optic phase plate whose electro-optic effect is strongly frequency dependent. Such a phase plate should have high dispersion in the electro-optic phase shift as is the case in several biaxial electro-optic crystals. Such crystals are described in "Handbuch Der Physik" by S. Fluegge, Springer Verlab Berline, 1961, vol. XXV/1, pp. 166–169. These crystals display dispersion of the optic axes, crossed axial dispersion (changes in the optic axial plane), and dispersion of the bisectrices. All these special effects are caused by the dispersion of the main indices of refraction. The changes in the ratios of the refractive indices lead to the desired dispersion effects.

Figure 8:
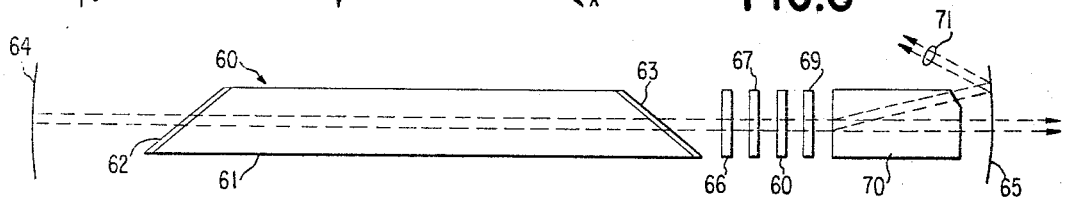
FIGURE 8 is a schematic diagram of a modification of the selector of FIGURE 6 wherein two laser frequencies may be simultaneously selected.

In FIGURE 8 there is shown a modified embodiment of the laser frequency selector which is capable of selecting two laser lines. As before, the laser cavity 60 comprises a laser tube 61 having Brewster windows 62 and 63. The cavity is bounded by mirrors 64 and 65. However, the tuning or frequency selector portion of the cavity contains two phase plates 66 and 67 and two electro-optic phase plates 68 and 69 in addition to a polarizing crystal 70. Phase plates 66 and 67 can be chosen so that the resultant phase shift of a particular wavelength of light is zero after passing through both plates. Furthermore, one of the phase plates may be replaced by an adjustable phase plate, such as a Soleil compensator. Therefore, the dispersion of plates 66 and 67 may cause a resultant phase shift of zero to a selected laser line which is then passed through electro-optic phase plates 68 and 69 with a zero electric field applied thereto. Consequently, substantially zero or a negligible phase shift will be imparted by plates 68 and 69 to the selected line. The line will pass through polarizing crystal 70 and be reflected back through the laser tube 61, thereby permitting lasing at the selected frequency. A second frequency may be selected by the embodiment of FIGURE 8 by applying proper voltages to plates 68 and 69 so that the resultant phase shift of all four plates is zero for the second selected wavelength. As in the FIGURE 6 embodiment, all the non-selected wavelengths remain elliptically polarized and their horizontal components are deflected out of the cavity 60 by polarizing crystal 70 along the path 71.

The use of two phase plates 66 and 67 provides greater dispersion than is available by the single plate of the system of FIGURE 6. When argon gas is used as the negative temperature medium, two or more lines which are linearly polarized in the same direction will lase. Consequently, if the total dispersion produced by plates 66 and 67 results in a total phase shift of two or more lines such that the difference in phase shift is 360° or an integral multiple thereof, then all such lines will lase. Such a result is obtained since the effective phase shift $\Delta \phi$ is the same for all the lines. Consequently, when the proper voltages are applied to the electro-optic phase plates 68 and 69 to produce $\Delta \psi$ to make the resultant phase shift $\Delta \phi + \pi \psi$ equal to zero, all these lines will pass through the optical cavity with very low losses and therefore will lase.

The transition time to switch from one frequency to another is limited by the laser oscillation build up time. This time is proportional to the overall length of the laser cavity, and for a 100 cm. cavity is approximately 0.1 microsecond. Thus, different laser wavelengths may be selected at a rate greater than a megacycle rate.

While the invention has been particularly shown and described with reference to preferred embodiments thereof, it will be understood by those skilled in the art that various changes in form and details may be made therein without departing from the spirit and scope of the invention.

What is claimed is:

1. In a laser cavity including a chamber containing a negative temperature medium, means for linearly polarizing light in a first direction, and a pair of spaced mirrors for reflecting the coherent linearly polarized light beam emitted from the medium along a path between the mirrors and through the medium and the polarizing means, said medium being capable of lasing at several characteristic wavelengths, a laser frequency selector comprising:
    (a) a first frequency dependent dispersion means in the light beam path for imparting a different polarization change to each wavelength of laser light, and
    (b) an adjustable means in the light beam path imparting to each wavelength of light a polarization change substantially independent of the wavelength, said adjustable means being adjustable to impart a polarization change to a first selected wavelength so that the resultant polarization change of said first selected wavelength is zero, thereby permitting lasing of the first selected wavelength but preventing lasing of the non-selected wavelengths.

2. A laser frequency selector as defined in claim 1 wherein:
    (a) said first frequency dependent dispersion means is an optically active crystal which rotates the linear polarization direction of each wavelength through a different angle,
    (b) said adjustable dispersion means comprises an electro-optic rotator which rotates the polarization direction of each wavelength through substantially the same angle as determined by the strength of an electric field to which the electro-optic rotator is subjected, and further comprises,
    (c) means for applying an adjustable electric field to said rotator to return the polarization direction of the selected wavelength to said first polarization direction.

3. A laser frequency selector as defined in claim 2 further comprising analyzer means passing without loss of the selected wavelength and attenuating the other wavelengths so that only the selected wavelength lases.

4. A laser frequency selector as defined in claim 1 wherein:
    (a) said first frequency dependent dispersion means is a first dispersive phase plate which imparts a different phase shift to each wavelength to elliptically polarize all wavelengths of the laser beam,
    (b) said adjustable dispersion means comprises an electro-optic phase plate which imparts to each wavelengths substantially the same phase shift as determined by the strength of an electric field to which said electro-optic phase plate is subjected, and further comprising,
    (c) means for applying an adjustable electric field to said electro-optic phase plate to return only the selected wavelength to a state of linear polarization.

5. A laser frequency selector as defined in claim 4 further comprising analyzer means passing without substantial loss light linearly polarized in said first direction and attenuating the other elliptically polarized wavelength so that only the selected wavelength lases.

6. A frequency selector as defined in claim 4 further comprising a second frequency dependent dispersive phase plate in the light path for imparting a different phase shift to each wavelength of light, the resultant mod. $2\pi$ phase shift imparted by said first and second frequency dependent phase plates being zero for a second selected wavelength, thereby permitting lasing of said second selected wavelength when the phase shift of said electro-optic plate is substantially zero.

7. A laser frequency selector as defined in claim 5 further comprising a second frequency dependent phase plate for imparting a different phase shift to each wavelength of light, said first and second frequency dependent phase shifting plates imparting the same mod. 2 phase shift to said first selected wavelength and to a second selected wavelength whereby said adjustable electro-optic phase plate may be adjusted to impart a phase shift to said first and second selected wavelengths so that the resultant mod. $2\pi$ phase shift of said first and second wavelengths is zero, thereby permitting lasing of said first and second selected wavelengths, but preventing the lasing of the non-selected wavelengths.

8. A laser frequency selector as defined in claim 7 wherein said negative temperature medium is ionized gas.

References Cited

Hufford et al.: "Ruby Laser Action at the $R_2$ Wavelength," Applied Optics, vol. 3 pp. 1499–1500, December 1964.

Pole et al.: "Laser Deflection and Scanning," Optical and Electro-Optical Information Processing, ed. by Tippett et al., M.I.T. Press, Cambridge, Mass., 1965, pp. 351–64.

Targ et al.: "Automatic Frequency Control of a Laser," Applied Optics, vol. 4, pp. 1523–27, December 1965.

JEWELL H. PEDERSEN, *Primary Examiner.*

E. BAUER, *Assistant Examiner.*

UNITED STATES PATENT OFFICE
CERTIFICATE OF CORRECTION

Patent No. 3,435,370                            March 25,

Thomas J. Harris et al.

It is certified that error appears in the above identified patent and that said Letters Patent are hereby corrected as shown below:

Column 7, line 63, "$\Delta\phi+\pi\psi$" should read -- $\Delta\phi+\Delta\psi$ --.
Column 8, line 52, "wavelengths" should read -- wavelength --. Column 9, line 2, "Mod. 2" should read -- Mod. $2^{\pi}$ --.

Signed and sealed this 5th day of May 1970.

(SEAL)
Attest:

Edward M. Fletcher, Jr.                      WILLIAM E. SCHUYLER,
Attesting Officer                              Commissioner of Pate